United States Patent
Goldsmith et al.

(10) Patent No.: US 9,766,601 B2
(45) Date of Patent: Sep. 19, 2017

(54) SYSTEM AND METHOD FOR EXPLICIT MODEL PREDICTIVE CONTROL

(71) Applicant: Mitsubishi Electric Research Laboratories, Inc., Cambridge, MA (US)

(72) Inventors: Abraham Goldsmith, Boston, MA (US); Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 516 days.

(21) Appl. No.: 14/480,769

(22) Filed: Sep. 9, 2014

(65) Prior Publication Data

US 2016/0070243 A1    Mar. 10, 2016

(51) Int. Cl.
*G05B 13/02* (2006.01)
*G05B 13/04* (2006.01)

(52) U.S. Cl.
CPC .................. *G05B 13/048* (2013.01)

(58) Field of Classification Search
CPC ...................................... G05B 13/048
USPC ...................... 700/28–55, 275–306
See application file for complete search history.

(56) References Cited

U.S. PATENT DOCUMENTS

| | | | | |
|---|---|---|---|---|
| 5,347,446 A | * | 9/1994 | Iino ...................... | G05B 13/048 700/29 |
| 5,394,322 A | * | 2/1995 | Hansen ................ | G05B 13/045 700/32 |
| 6,445,390 B1 | * | 9/2002 | Aftosmis ................ | G06T 17/20 345/420 |
| 6,718,291 B1 | * | 4/2004 | Shapiro ............... | G06F 17/5018 703/14 |
| 7,844,352 B2 | | 11/2010 | Vouzis et al. | |
| 2004/0064202 A1 | * | 4/2004 | Kothare ................ | G05B 17/02 700/39 |

(Continued)

OTHER PUBLICATIONS

Maeder, Urban, Raphael Cagienard, and Manfred Morari. "Explicit model predictive control." Advanced strategies in control systems with input and output constraints. Springer Berlin Heidelberg, 2007. pp. 237-271.*

(Continued)

*Primary Examiner* — Satish Rampuria
(74) *Attorney, Agent, or Firm* — Gene Vinokur; James McAleenan; Hironori Tsukamoto

(57) ABSTRACT

A method for controlling a system using an explicit model predictive control (EMPC) evaluates, with respect to a state of the system, each inequality in a set of inequalities defining a set of regions of a state space of the system to produce a set of Boolean results. At least some of the inequalities are evaluated concurrently, and a size of the set of Boolean results equals a size of the set of inequalities. The method determines a region including the state by applying a Boolean function to elements of the set of Boolean results corresponding to inequalities forming boundaries of the region and determines a control for the system based on the state and a gain associated with the region. At least some Boolean functions are applied to corresponding elements concurrently after all elements in the set of Boolean results are evaluated.

13 Claims, 13 Drawing Sheets

(56) References Cited

U.S. PATENT DOCUMENTS

2004/0107012 A1* 6/2004 Das .................... G05B 13/042
  700/53
2005/0107895 A1* 5/2005 Pistikopoulos ........ G05B 17/02
  700/52

OTHER PUBLICATIONS

Bemporad, Alberto, Francesco Borrelli, and Manfred Morari. "Model predictive control based on linear programming~ the explicit solution." IEEE Transactions on Automatic Control 47.12 (2002): pp. 1974-1985.*

Alessio, Alessandro, and Alberto Bemporad. "A survey on explicit model predictive control." Nonlinear model predictive control. Springer Berlin Heidelberg, 2009. pp. 345-369.*

* cited by examiner

SYSTEM AND METHOD FOR EXPLICIT MODEL PREDICTIVE CONTROL

FIELD OF THE INVENTION

This invention relates generally to controlling an operation of a system, and more particularly to controlling the operation using an explicit model predictive control (EMPC).

BACKGROUND OF THE INVENTION

Many advanced control techniques are formulated as optimization problems, which can be solved by programming. One class of such techniques is optimization-based receding time horizon control, such as model predictive control (MPC). There are MPC formulations for both linear and nonlinear systems. Nonlinear MPC solves nonlinear programs in real-time, which can be a challenging task due to limited computing resources, the complexity of the problem to solve, or the time available to solve the problem. Therefore, most of the practical applications are based on a linearity assumption or approximation. The linear MPC typically solves a quadratic programming problem.

The MPC is based on an iterative, finite time horizon optimization of a model of a system and has the ability to anticipate future events to take appropriate control actions. This is achieved by optimizing the operation of the system over a future finite time-horizon subject to constraints, and only implementing the control over the current timeslot. For example, the constraints can represent physical limitations of the system, legitimate and safety limitations on the operation of the system, and performance limitations on a trajectory. A control strategy for the system is admissible when the motion generated by the system for such a control strategy satisfies all the constraints. For example, at time t the current state of the system is sampled and an admissible control strategy minimizing the cost is determined for a relatively short time horizon. Specifically, a real-time calculation determines a cost-minimizing control strategy until time t+T. Only the first step of the control strategy is implemented, then the state is sampled again and the calculations are repeated starting from the current state, yielding a new control and new predicted state path. The prediction horizon keeps being shifted forward and for this reason MPC is also called receding horizon control.

The MPC can be used to generate the actual trajectory of the motion of the system based on the model of the system and the desired reference trajectory by solving an optimal control problem over a finite future time horizon subject to various physical and specification constraints of the system. The MPC aims for minimizing performance indices of the system motion, such as the error between the reference and the actual motion of the system, the system energy consumption, and the induced system vibration.

When compared to other control strategies, the MPC has the advantage of explicitly accounting for constraints and the ability to handle multiple inputs and outputs. However, the MPC is computationally expensive because it requires that an optimization problem be solved at each time step in order to calculate the control output of the system.

An explicit MPC (EMPC) is formulated as a way of dealing with these limitations. In the explicit MPC the optimization part of the problem is solved offline, prior to implementing the controller. The solution to the offline part of the algorithm is represented as a set of adjacent, convex regions in an n-dimensional state space. The real-time part of the control process searches the state space to determine which region the system is currently operating in. Each region is associated with a set of coefficients used to calculate the control output, see, e.g., WO2013/136090.

The EMPC reduces the amount of real-time computation required to implement an MPC controller by shifting part of the computation offline. However, the real-time part of the EMPC may still require many thousands operations for searching the state space, which makes explicit model predictive controllers implemented using general purpose computing units and circuitry too slow for some real-time control applications, especially when the MPC optimal control problem has many decision variables and/or constraints.

Application-specific circuits are customized for a particular use, rather than intended for a general-purpose use. In contrast with the general purpose circuitry, it is always a challenge to optimize the design of the application-specific circuits for the specific problem. Accordingly, there is a need to provide the application-specific circuit for controlling a system using the EMPC.

SUMMARY OF THE INVENTION

Some embodiments of the invention are based on a realization that an explicit model predictive control (EMPC) largely includes basic operations performed repeatedly. These operations also exhibit a very high degree of atomicity, meaning that they do not share information, and thus can be performed in parallel to reduce processing time.

In addition, some embodiments are based on another realization that output of the parallel computations can be mapped to various regions of a state space using a predetermined mapping. Such mapping enables scaling of an application-specific circuitry for different types and sizes of the controlled systems.

In addition, some embodiments are based on another realization that the EMPC includes redundant inequalities for evaluating adjoint regions of the state space. In contrast with the sequential evaluation, if the inequalities and the adjoint regions are evaluated in parallel, then, such redundancy can be avoided via reformulation of values of evaluation of the inequalities. This can further reduce the time of computation.

For example, if a first region of a state space adjoint a second region of the state space along a border defined by a common inequality, then there is no need to formulate different inequalities for the first and the second regions. The common inequality can be defined, e.g., only for the first region and the difference in the evaluation of the common inequality for the second region can be accounted in negation of the result of evaluation of the common inequality for the first region.

Thus, some embodiments of the invention describe a digital circuit for implementing explicit MPC systems that exploits parallelism in the problem to reduce the amount of time for computing a solution. The circuit is scalable such that a controller can be synthesized for a specific control problem. By exploiting parallelism to improve performance, the embodiments allow explicit MPC to be applied to systems that would otherwise be too complex for real time control.

Accordingly, one embodiment of the invention discloses a method for controlling a system using an explicit model predictive control (EMPC). The method includes evaluating, with respect to a state of the system, each inequality in a set of inequalities defining a set of regions of a state space of the system to produce a set of Boolean results, wherein at least some of the inequalities in the set of inequalities are evaluated concurrently, and wherein a size of the set of Boolean results is equal to a size of the set of inequalities; determining a region including the state by applying a Boolean function to elements of the set of Boolean results corresponding to inequalities forming boundaries of the region, wherein at least some Boolean functions are applied to corresponding elements concurrently after all elements in the set of Boolean results are evaluated; and determining a control for controlling the system based on the state and a gain associated with the region. The steps of the method are performed by a processor.

Another embodiment discloses a controller for controlling a system using an explicit model predictive control (EMPC), including an inequality processing (IP) unit for evaluating, with respect to a state of the system, each inequality in a set of inequalities defining a set of regions of a state space of the system to produce a set of Boolean results having one element for each inequality in the set, wherein at least some inequalities from the set are evaluated concurrently, wherein a zero in a particular position of the set indicates that a corresponding inequality evaluated to false and a one indicates that the corresponding inequality evaluated to true; a region identification and gain lookup logic (RGL) unit for determining a region including the state by applying a Boolean function to elements of the set of Boolean results corresponding to inequalities forming boundaries of the region, and for determining a gain associated with the region; and an output processing unit for determining a control for controlling the system based on the state and the gain associated with the region.

BRIEF DESCRIPTION OF THE DRAWINGS

FIGS. 4A and 4B are examples of tables showing encoding with associated Boolean generator functions according to some embodiments of the invention;

DETAILED DESCRIPTION OF THE PREFERRED EMBODIMENT

Figure 1:
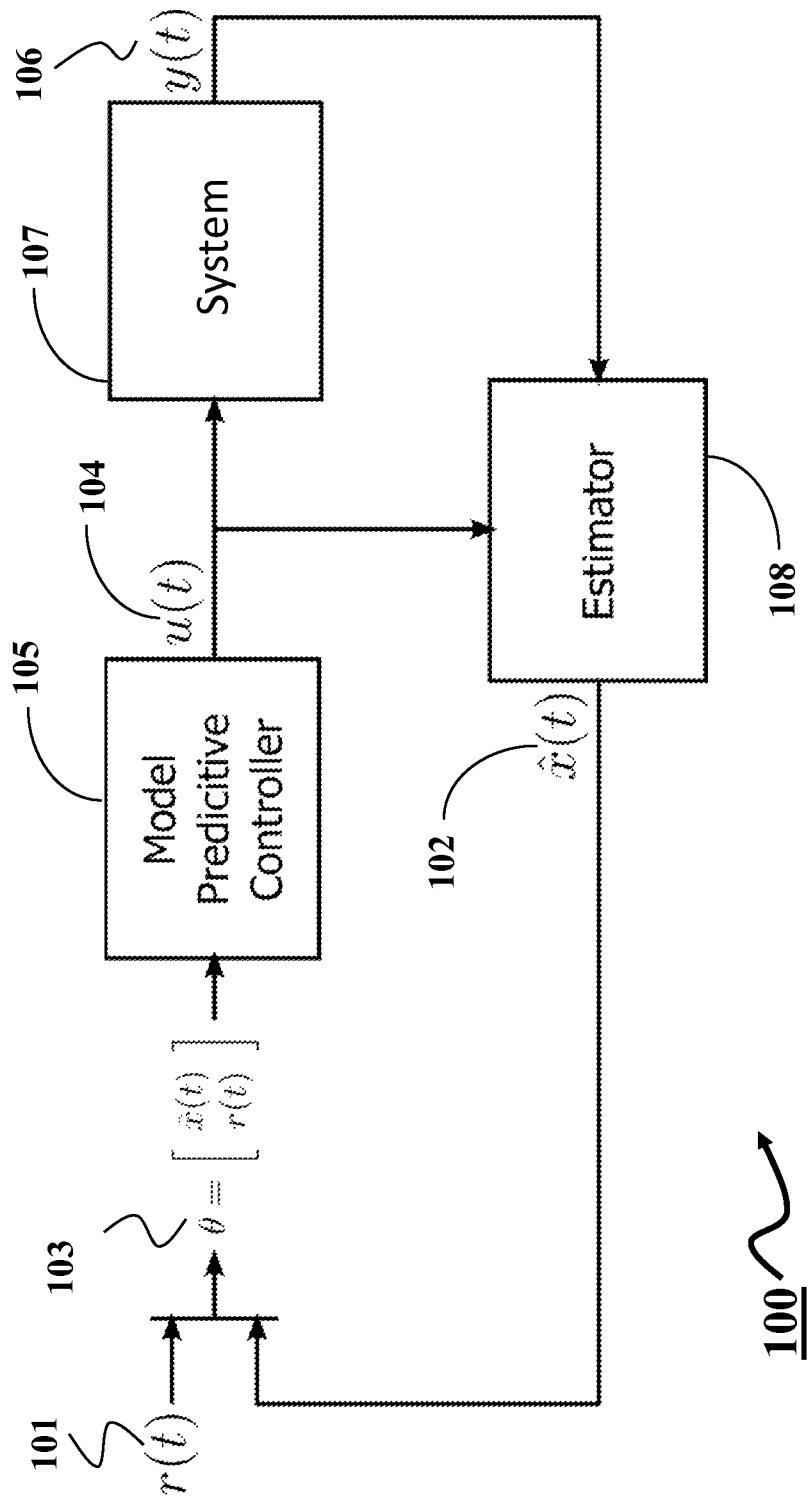
FIG. 1 is a block diagram of a control system using an explicit model predictive control (EMPC) according to some embodiments of the invention.

FIG. 1 shows a block diagram of a control system 100 using an explicit model predictive control (EMPC) according to some embodiments of the invention. The control system 100 includes a model predictive controller 105 and a state estimator 108 to control a system 107. During the operation, the controller receives a reference signal r(t) 101 indicating the reference operation of the system as a function of time t. The reference signal can be, for example, a motion or a position command, or represent the desired value of some parameter in the system. In response to receiving the reference signal r(t) 101, the controller generates a control signal u(t) 104 for the system. In response to the input, the system updates the output y(t) 106 and the state x(t) 102 of the system.

The system can be any device that is controlled by manipulating control signals (inputs), possibly associated with physical quantities such as voltages, pressures, forces, and returns system output possibly associated with physical quantities such as currents, flows, velocities, positions. The values of the output signal are related in part to previous system output values, and in part to previous and current input values. The dependency of previous inputs and previous outputs is encoded in the system state. The operation of the system, e.g., a motion of the system, can include a sequence of output values generated by the system following the application of certain input values.

The controller can be implemented in hardware or a software program executed in a processor, e.g., a microprocessor, which at fixed or variable period sampling intervals receives the system outputs and the reference operation of the system motion, and determines, using this information, the inputs for operating the system. The processor is suitably programmed to perform the steps of the methods according to various embodiments.

In various embodiments of the invention, the model predictive controller 105 combines the reference signal r(t) 101 with the true or estimated state x(t) 102 of the system to form the augmented state vector θ 103. The model predictive controller determines the optimum value of the control signal u(t) 104, based on the value of augmented state vector θ 103. The estimator 108 uses the system output y(t) 106 along with the current and past values of the control signal u(t) to estimate the current state of the system.

In some systems the state is completely determined by the plant outputs y(t), in which case the estimator may simply form the state estimate directly as $$x(t)=My(t)$$

where M is an appropriate square matrix of full rank. However, it is more common that some or all of the system state variables are unobservable, in which case the state estimate may be formulated in a number of different ways. For example for a linear system $$x(t+1)=Ax(t)+Bu(t)$$

$$y(t)=Cx(t)+Du(t)$$

where A, B, C, D are matrices of appropriate size, an estimator can be made as $$z(t+1) = Az(t) + Bu(t) - L(y(t) - Cz(t) - Du(t))$$

$$\hat{x}(t) = C_z z(t) + C_u u(t) + C_y y(t)$$

where $L$, $C_z$, $C_u$, $C_y$ are appropriately built matrices.

Model Predictive Control (MPC) is a control algorithm that reads the augmented state or state estimate of a dynamical system and solves a finite horizon optimal control problem formulated over a future horizon from the system dynamics, system constraints, and objective cost function. Of the optimal sequence of inputs over the future horizon the first component is applied to the system, and a new optimal control problem is solved over a shifted future horizon when the next augmented state is read.

The solution at every control cycle of the optimal control problem may require a significant amount of computation and hence the MPC algorithm cannot be executed in systems where the controller is required to run very fast (e.g., once every few microseconds) or that have limited computational capabilities. An alternative is to compute the parametric solution of the MPC optimal control problem as a function of the augmented state. For linear systems the explicit solution of the MPC optimal control problem results in a piecewise affine function $$u = \begin{cases} C_1 \theta + E_1 & \text{if } H_1 \theta \le K_1 \\ \vdots & \\ C_N \theta + E_N & \text{if } H_N \theta \le K_N \end{cases}.$$

Figure 2:
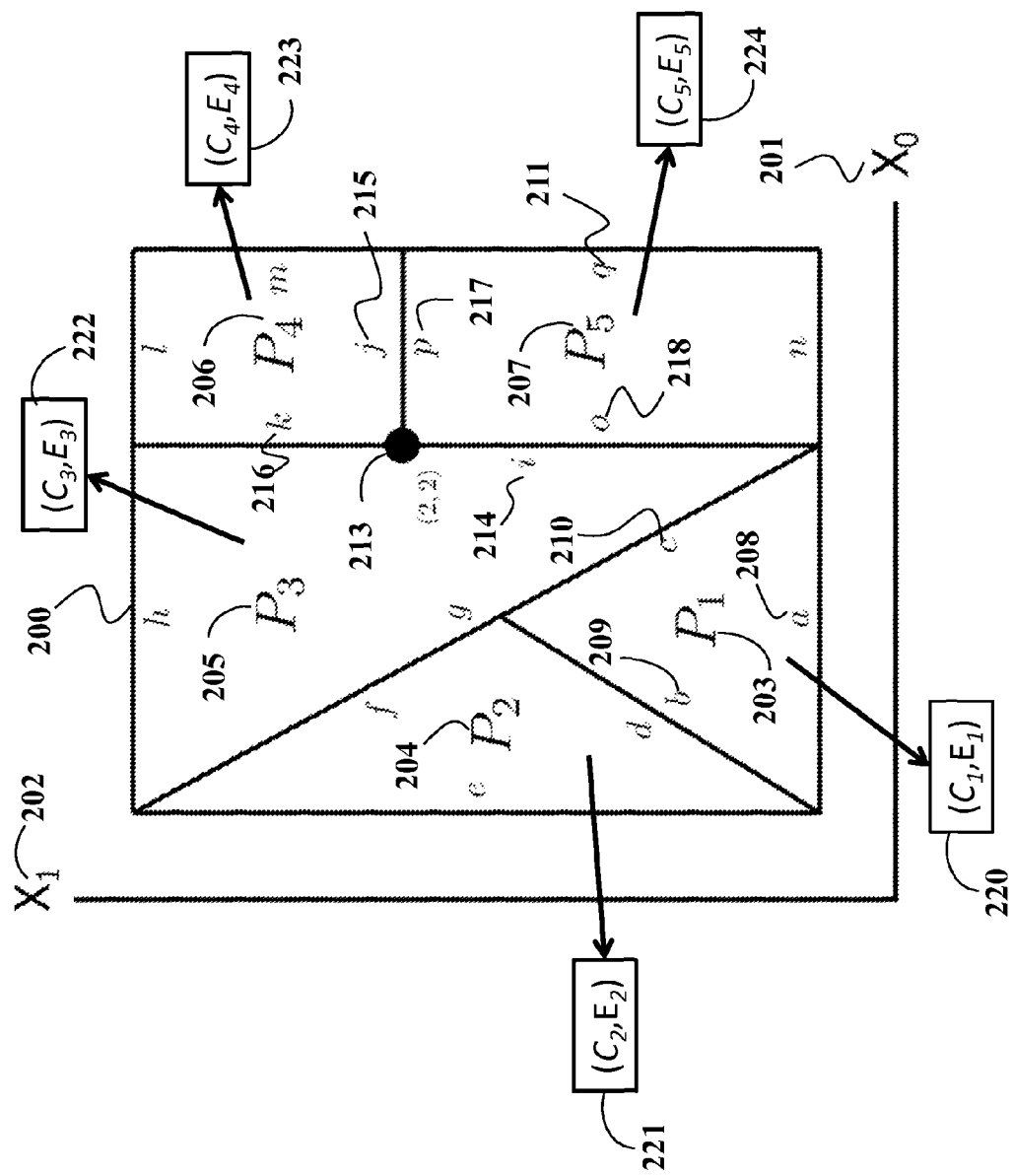
FIG. 2 is a diagram of an exemplar state space of the controlled system partitioned into polyhedral regions according to principles of the EMPC.

FIG. 2 is a diagram of a fragment of a state space 200 of the controlled system partitioned into polyhedral regions according to principles of the EMPC. In this example, the state space is two dimensional with two states $X_0$ 201 and $X_1$ 202, and the state vector $\theta$ is $[X_0\ X_1]$. Usually, however, the state space is n-dimensional, with n>2.

The state space 200 is divided into a polyhedral partition with five regions $P_1$ 203, $P_2$ 204, $P_3$ 205, $P_4$ 206, and $P_5$ 207. Each controller region $P_i$ has a set of inequalities that define its boundaries. These inequalities can be written in matrix form as $$H_i \theta - k_i \le 0,$$

$$T_i = [H_i - k_i],$$

wherein i represents the region number, H and k are coefficients of the inequality, $T_i$ is auxiliary matrix defined for convenience.

In the diagram of FIG. 2, each lowercase letter represents an inequality and makes up a single row of the matrix $T_i$. For example, region $P_1$ is represented by three inequalities a 208, b 209, and c 210. The combined matrix representing the boundaries of $P_1$ is $$T_1 = \begin{bmatrix} a \\ b \\ c \end{bmatrix}.$$

Furthermore, the entire system of inequalities for region $P_1$ is $$[T_1] \begin{bmatrix} \theta \\ 1 \end{bmatrix} \le 0.$$

Each region $P_i$ has a set of gains and offsets $(C_i, E_i)$ associated with it, such that region $P_1$ 203 is associated with $(C_1, E_1)$ 220, region $P_2$ 204 is associated with $(C_2, E_2)$, and so on.

Figure 3A:
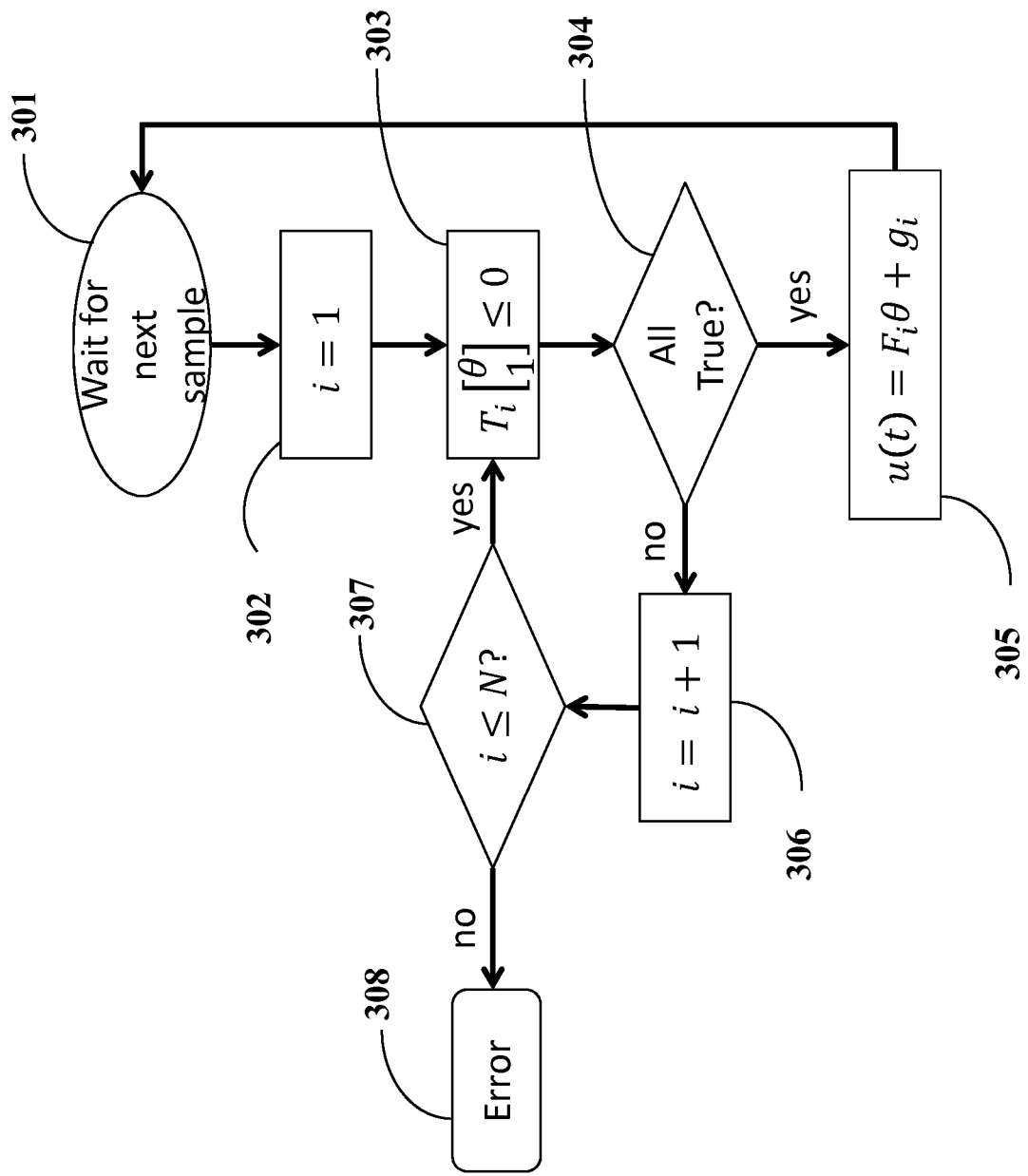
FIG. 3A is a block diagram of a conventional method for controlling the system using the EMPC.

FIG. 3A is a flow chart illustrating the operation of typical prior art software implementations of EMPC controllers. The EMPC controllers are inherently discreet time, or sampled, systems. As such, the controller waits for a new sample 301 to commence computation of the next control output. An index i, which indicates the control region being evaluated, is initialized 302 to 1. Then, the product of $T_i$ and the current state theta is computed 303. The inequalities defining the boundaries of the region i are evaluated 304 with respect to the state of the system. If all inequalities are true, then, the active region including the states and the controller output is calculated 305 using the gain coefficients for region i, $F_i$ and $g_i$, and the controller waits for a new sample.

If at least one inequality is not true, then the index i is incremented 306 by one and checked to make sure it is less than or equal to N 307, the total number of regions in the controller. The controller continues evaluating the inequalities for each region sequentially until a region is found where all of the inequalities evaluate to true or all of the regions have been searched. When i exceeds N all of the regions have been searched without finding an active region. In this case some special error action 308 is taken. The error action could include reprocessing the previous control output, reverting to some default gains $C_d$ and $E_d$ for the controller output computation, or some other action that meets the requirements of the system.

Evaluating the inequalities and determining active regions is known as region searching. Most of the computation performed by EMPC controllers is dedicated to the region searching task. Therefore, to improve the performance of the EMPC controller, it is desirable to improve the performance of the region searching task.

Some embodiments of the invention are based on a realization that the region searching task includes a large number of repeated operations. These operations also exhibit a very high degree of atomicity, meaning that they do not share information, and thus can be performed in parallel to reduce the time of computation.

Figure 3B:
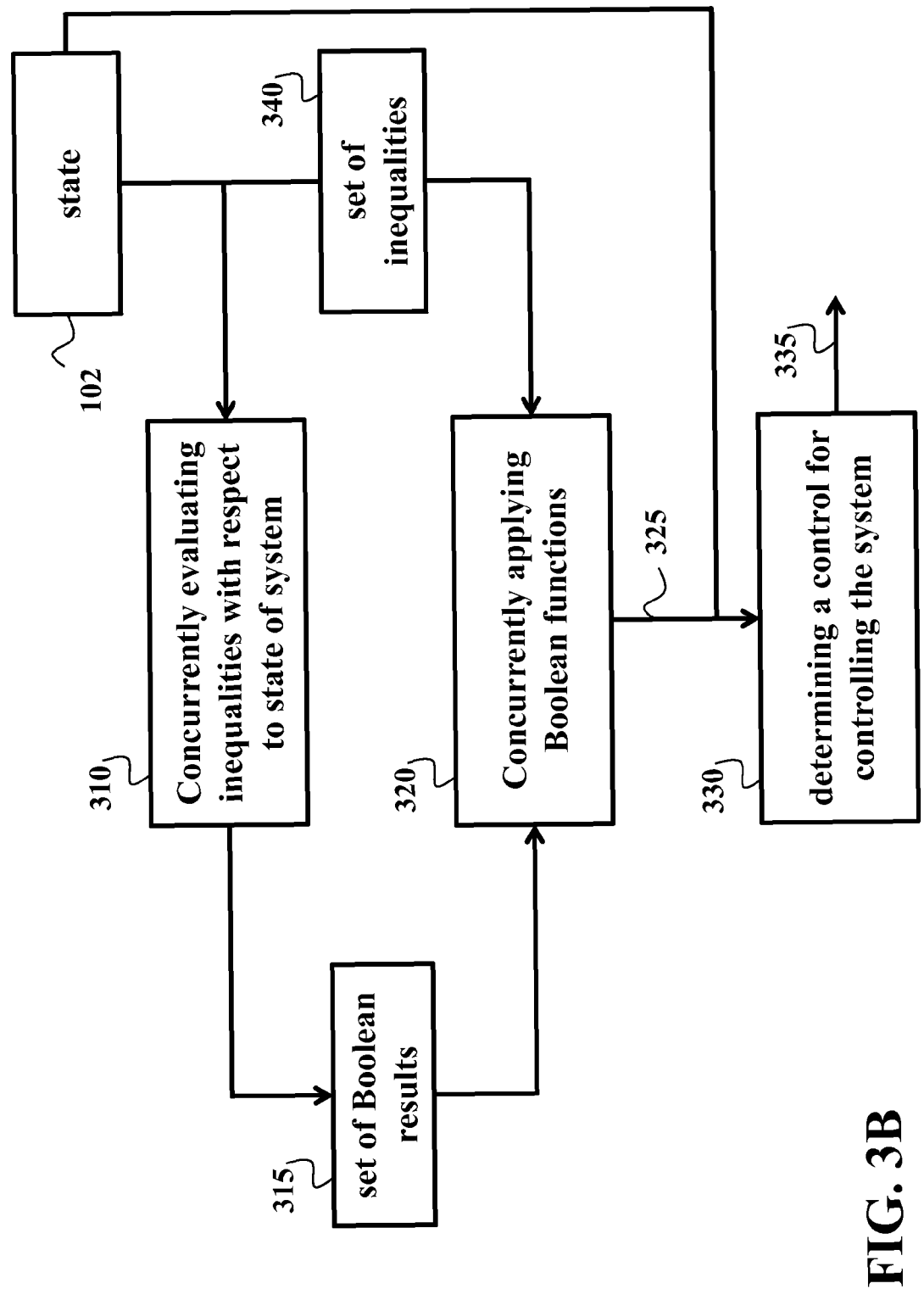
FIG. 3B is a block diagram of a method for controlling the system using the EMPC according to some embodiments of the invention.

FIG. 3B shows a block diagram of a method for controlling a system using the EMPC according to some embodiments of the invention. The method evaluates 310, with respect to a state 102 of the system, each inequality in a set of inequalities 345 to produce a set of Boolean results 315. The inequality in a set of inequalities 345 defines a set of regions of a state space of the system, as shown in an example of FIG. 2. In contrast with the sequential evaluation of the inequalities for different regions, at least some or all inequalities from the set are evaluated concurrently to produce the set of Boolean results 315, wherein a size of the set of Boolean results equals a size of the set of inequalities.

For example, each inequality can be evaluated by taking the scalar product of its coefficients and the augmented system state $\theta$. The scalar product of two vectors, also known as the dot "." product, is calculated by multiplying corresponding elements together and then summing the products, as in the formula $$a \cdot b = \Sigma_{i=1}^n a_i b_i.$$

Some embodiments are based on another realization that this formula is also the formula for a Multiply Accumulate (MAC) operation, which is one of the fundamental building blocks of many digital signal processors (DSP). Because of its fundamental nature, many high performance circuit implementations of the MAC operation are known. Of particular advantage in some embodiments of the invention is that the hardware accelerated MAC blocks are included in field programmable gate arrays (FPGAs), such as the DSP48 block present in many Xilinx® FPGAs, and MAC libraries available for many ASICs vendors. Therefore, some embodiments of the invention exploit parallelism in the EMPC by evaluating the inequalities 340 on a plurality of MAC units.

The parallel solution to the region search problem is equivalent to taking all of the inequality matrices from each region and forming a new matrix D that contains all of the inequality coefficients as follows $$D \equiv \begin{bmatrix} H_1 & -k_1 \\ \vdots & \vdots \\ H_N & -k_N \end{bmatrix} = \begin{bmatrix} T_1 \\ \vdots \\ T_N \end{bmatrix},$$

where N is the total number of controller regions. Instead of evaluating $$H_i \theta - k_i \leq 0$$

for each region sequentially, some embodiments determine system matrix D as $$D \begin{bmatrix} \theta \\ 1 \end{bmatrix} \leq 0,$$

which evaluates the inequalities in the system in a single step. The highest degree of parallelism is achieved when each MAC unit evaluates a single row of D, corresponding to a single inequality. However, in most cases the system matrix D has more rows that there are MAC units in the controller. In this case, the system matrix D is partitioned into M sub-matrices, where M is the number of MAC units used in the controller circuit. If L is the number of rows in D, then each MAC unit processes a sub-matrix of D with L/M rows. After the inequalities are evaluated, the set of Boolean results is, e.g., a vector o with L elements where each element i indicates whether the corresponding row of D evaluated true, in which case o(i)=1, or false, in which case o(i)=0.

Evaluating the inequalities in parallel can improve performance of the region searching tasks, and, thus, the performance of the EMPC. However, such an evaluation also presents some challenges that are not present in standard serial implementations of the EMPC. In contrast with the sequential evaluation of the regions, some embodiments determine the active region only after all elements in the set of Boolean results are evaluated. In order to determine which region is active from the results in the vector o, the mapping between particular values of o and the corresponding active region is needed.

One embodiment address this problem by recording correspondence between elements of the set of Boolean results, e.g., value of vector o, and regions during the process of creating the D matrix. Then, a lookup table is built that stores which region is active for each possible value of o. However, in some systems, the number of inequalities L is on the order of $10^2$-$10^4$, and require a lookup table with between $2^{10^2}$ and $2^{10^4}$ entries, which makes this embodiment impractical.

Accordingly, some embodiments of the invention determine 320 a region 325 that includes the state by applying a Boolean function to elements of the set of Boolean results corresponding to inequalities forming boundaries of the region. Next, a control 335 for controlling the system is determined based on the state 102 and a gain associated with the region 325.

The Boolean functions have the advantage of being efficient and easy to implement in both FPGAs and ASICs. Each function uses Boolean operations, such as AND and NOT, on specific elements of the result vector o, to determine which region is active. The specific elements of the vector o that each function operates on correspond to the inequalities that form the boundaries of that region. The output of each function is a single bit that is set to one when the region is active and, otherwise, is set to zero. By utilizing a set of unrelated Boolean functions, each operating on a small subset of the vector o, the circuit complexity is reduced.

Some embodiments of the invention also consider latency of the circuitry of the controller. The MAC units in FPGAs and the MAC cells in ASIC libraries are optimized for low latency. For example, the DSP48 blocks in the current generation of Xilinx® FPGAs can operate at clock frequencies in excess of 600 MHz. To achieve maximum efficiency, one goal of some embodiments is for the complete circuit to operate as close as possible to the upper frequency limit set by the MAC blocks. The simplicity of the Boolean function representation of controller regions results in low latency implementation, which ultimately improves performance in the overall controller circuit.

For example, the system matrix D for the state space 200 of example of FIG. 2 includes the following set of inequalities $$D = [a\ b\ c\ d\ e\ f\ g\ h\ i\ j\ k\ l\ m\ n\ o\ p\ q]^T.$$

The result of evaluating each inequality is stored in the vector o sequentially such that $o_1$ includes the Boolean result of evaluating inequality a 208 and $o_L$ includes the Boolean result of evaluating inequality q 211. In order for a region to be active, all of its inequalities must evaluate to true, which means that all of the corresponding elements of o are one. Therefore, the Boolean function representing any controller region is the logical AND of all of the elements of o that correspond to inequalities forming boundaries of that region. For region $P_1$ 203, those elements are 1, 2, and 3, yielding the following Boolean function $$F_1 = o_1 \text{ AND } o_2 \text{ AND } o_3.$$

In Boolean logic, the AND function is equivalent to multiplication, and the OR function is equivalent to addition. Thus, $F_1$ can be written as $F_1 = o_1 \cdot o_2 \cdot o_3$ or $F_1 = o_1 o_2 o_3$. Thus, in one embodiment, the Boolean functions for the state space 200 include $$F_1 = abc = o_1 o_2 o_3;$$

$$F_2 = def = o_4 o_5 o_6;$$

$$F_3 = hig = o_7 o_8 o_9;$$

$$F_4 = jklm = o_{10} o_{11} o_{12} o_{13};$$

$$F_5 = nopq = o_{14} o_{15} o_{16} o_{17}.$$

Accordingly, in some embodiments the set of Boolean results is a binary vector o, wherein each element of the binary vector equals one if a Boolean result of a corresponding inequality is true, and, otherwise, equals zero. The Boolean function is a product of the combinations of elements, such that an element of the output vector corresponding to the region is one, and other elements of the output vector are zero.

Some embodiments store the output of the Boolean functions $F_i$ in an output vector q which has N elements, one for each region, such that $$q=[F_1, F_2, \ldots F_N].$$

Some embodiments of the invention use the output vector q to determine address in a memory of the controller storing control coefficients associated with the region, e.g., set of gains $C_i$ and $E_i$, to determine the control output u for controlling the system. For example, one embodiment determines each bit of an address in a memory storing the gains as a Boolean combination of products of subsets of elements of the output vector q.

For example, in one embodiment of the invention the gain coefficients are stored in a linearly addressable memory. In general, C is matrix and E is a vector, which means that more than one memory address is required to store the gain coefficients for a single region. For example, in the EMPC for the state space 200 of FIG. 2, the matrix $C_i$ has two elements and the vector $E_i$ has one element. Therefore, each region requires three addresses and the entire state space requires fifteen addresses.

In one representation of the EMPC controller the boundaries between regions belong to all regions that share that boundary. This is a natural result of the fact that all inequalities are formulated as non-strict inequalities, i.e., "less than or equal to." In this embodiment, the output of the system can be the same along that boundary regardless of which of the bordering region's gains are used to calculate the system output.

For example, referring again to FIG. 2, the point (2,2) 213 falls at the intersection of three regions, $P_3$ 205, $P_4$ 206, and $P_5$ 207, and five inequalities, i 214, j 215, k 216, p 217, and o 218. At this point 213

$$u=C_3\theta+E_3=C_4\theta+E_4=C_5\theta+E_5,$$

wherein u is a control outputted by the EMPC.

In software implementations of MPC that solve the region search problem by checking each region sequentially, the fact that the state can belong to multiple regions is of little consequence. The first region in which all of the inequalities evaluate to true is selected as the active region and the gains of that region are used in the controller output calculation.

In some embodiments, however, multiple regions can be active simultaneously. Because regions are searched in parallel, the regions that include the current state can be identified as active by their respective Boolean function $F_i$. For example, if the state falls on the point (2,2) 213, $P_3$ 205, $P_4$ 206, and $P_5$ 207 can all be active regions. It is necessary to select one region from those three regions so that the gain coefficients can be addressed in the linear memory in which they are stored.

To resolve this issue, some embodiments of the invention use a modified priority encoding scheme to select one region from several active ones and then generate an address that is the offset of the active region's gain coefficients in the linear gain memory.

Figures 4A, 4B:
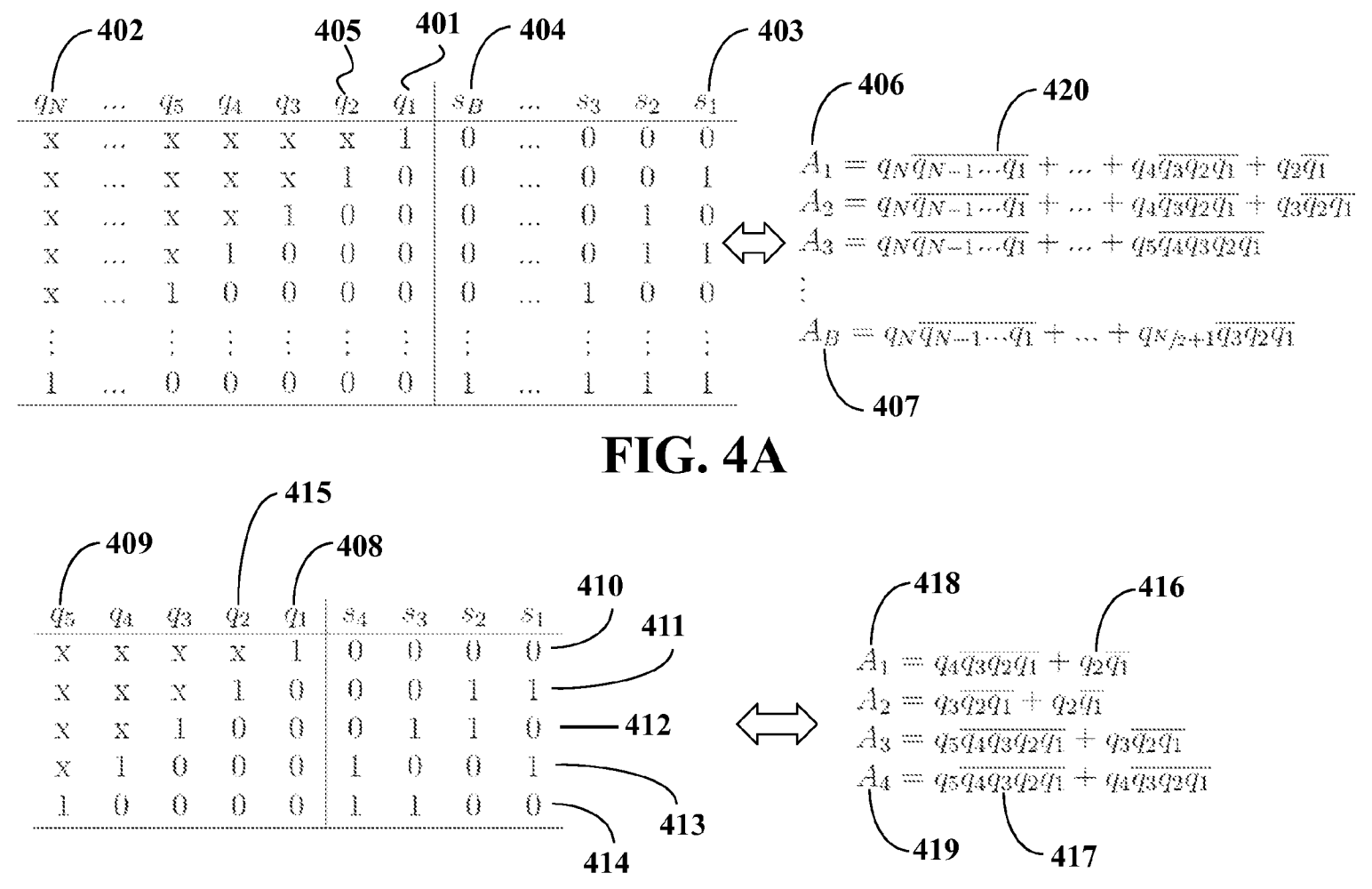

FIG. 4A is a generic truth table and associated generator functions for a priority encoder with N inputs, $q_1$ 401 through $q_n$ 402, and B outputs, $s_1$ 403 through $s_b$ 404 according to one embodiment of the invention. In this embodiment, N is an integer power of 2 so that the table is fully populated and therefore the number of bits B required to encode N is Log 2(N). The binary value of the output vector s indicates which input q is active.

The x's in the table indicate "don't care" bits used to prioritize the inputs. The input bits q are the elements of the output vector q having the outputs of the Boolean functions representing each region. In this table, $q_1$ 401 has the highest priority and each successive bit has lower priority than the preceding bit. When $q_1$ is '1' the output s is forced to 0 . . . 000, regardless of the state of the other inputs. When $q_2$ 405 is '1' the output s is forced to 0 . . . 001, regardless of the state of the other inputs except for $q_1$, which must be '0'. This continues through the q bits until $q_N$, which can be overridden by any of the previous bits. This encoding scheme provides a mechanism for selecting one region from multiple active regions.

The Boolean functions $A_1$ 406 through $A_B$ 407 are the generator functions for each bit of the output address vector s determining each bit of an address in the memory storing the gain as a Boolean combination of products of subsets of elements of the output vector. Each generator function $A_i$ corresponds to a column $s_i$ in the table. Every '1' in an $s_i$ column corresponds to a product term in the generator function. The horizontal bar above some terms indicates Boolean negation. Multiple product terms are combined using the Boolean OR function, indicated by the + sign.

FIG. 4B shows this encoding scheme as applied to the control system of FIG. 2A. The system has five regions and therefore the vector q has five elements. Here $g_1$ 408, representing the region $P_1$ 203, has the highest priority and $q_5$ 409, representing the region $P_5$ 207 has the lowest priority. There are three gain coefficients per region in this example which means that the gain memory has fifteen elements to be addressed. The number of bits B required to address M elements is $$B=\lceil \log_2(M) \rceil.$$

In this example, the number of bits B is four, and thus four bits are needed to address the gain memory.

The offsets of gain coefficients of each region are 0 (0b0000) 410, 3 (0b0011) 411, 6 (0b0110) 412, 9 (0b1001) 413, and 12 (0b1100) 414. This is a difference between the normal priority encoder and the implementation used in this embodiment. A normal priority encoder produces a fully encoded output with the minimum number of output bits s required to enumerate the inputs. In this embodiment of the invention, the inputs are mapped to a non-minimum encoding that is designed to suit the needs of the particular control problem at hand.

In this table, the region $P_1$ 203, corresponding to $g_1$ 408 is given the highest priority. The product term corresponding to $q_1$ is simply $q_1$ because its highest priority. The region $P_2$ 204, corresponding to $q_2$ 415 has the second highest priority, and is represented by the product term $q_2\bar{q_1}$ 416, indicating that region $P_2$ can only be active if region $P_1$ is not active. Finally, the region $P_5$ 207 has the lowest priority, and is represented by the product term $q_5\bar{q_4}\bar{q_3}\bar{q_2}\bar{q_1}$ 417, indicating that region $P_5$ can only be active if all of the other regions are not active.

Returning to the example of FIG. 2 where the state falls at point (2,2) 213, the Boolean functions $F_3$, $F_4$, and $F_5$ are evaluated to the value one and the Boolean functions $F_1$, and $F_2$ are evaluated to the value zero. The vector q is [1,1,1,0,0], using descending ordering like the column headings. By comparing q to each row, the row three matches the pattern, indicating that region $P_3$ is the highest priority active region. Moving to the right of the vertical bar, the region $P_3$ is mapped to s=[0 1 1 0], which is 6, the desired gain offset. To verify that this is in fact the case, insert the bits of the q vector into the generator functions and compute the result $$A_4=1\overline{1100}+1\overline{100}=0+0=0,$$

$$A_3=1\overline{1100}+1\overline{00}=0+1=1,$$

$$A_2=1\overline{00}+0\overline{0}=1+0=1,$$

$$A_1=1\overline{100}+0\overline{0}=0+0=0.$$

Thus, the vector s, composed of the outputs of the generator functions $A_1$ 418 through $A_4$ 419, does indeed produce the value 6 (0b0110) as desired.

Although this technique does resolve the issue of having multiple active regions, it is limited to relatively small EMPC problems. Most of the generator functions $A_1$ through $A_B$ include a product term that has N elements, such as 417 and 420. As the number of regions grows the number of elements in that term grows too. In general, the latency of the circuit that implements these functions increases as the number of terms grows. It is not uncommon for an EMPC controller to have 1000 or more regions, which would result in several product terms with 1000 or more elements. This, in turn, would yield a physical circuit with high latency, which is undesirable.

Therefore, another embodiment of the present invention alters the formulation of the original EMPC controller specification such that no more than one region may be active simultaneously. By doing so, the need for priority is eliminated and the latency of the address generator circuits is decoupled from the number of regions in the controller. Furthermore, the number of operations required to complete the region search task is greatly reduced and overall controller performance is improved.

Figure 5A:
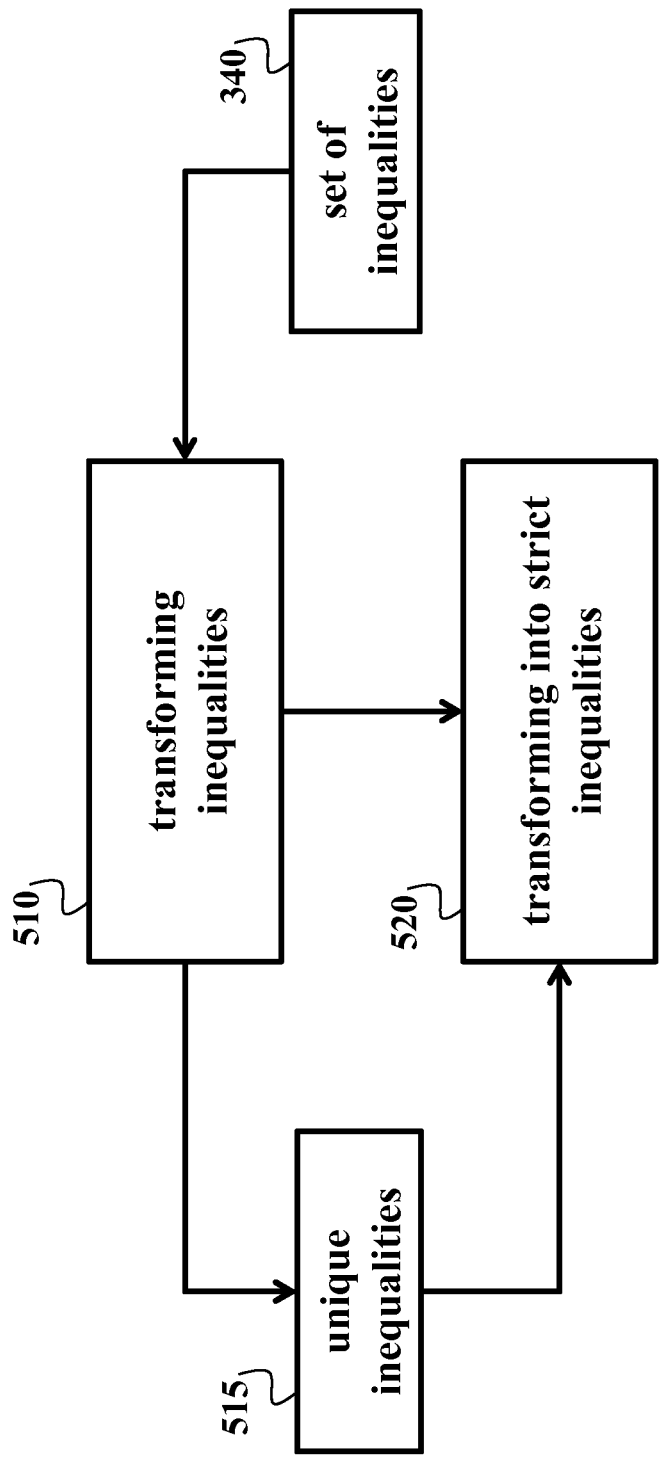
FIG. 5A shows a block diagram of a method for reducing complexity of the representation of the state space of the control system according to one embodiment of the invention.

FIG. 5A shows a block diagram of a method for reducing complexity of the polyhedral partition of the state space of the control system according to one embodiment of the invention, which leads to an increase of the speed of computation of the EMPC. This embodiment is based on the realization that many inequalities in the regions are redundant. For example, inequalities i 214, o 218, and k 216 in FIG. 2, all fall on the same line. The inequalities k and o belong to regions on one side of the line and the inequality i belongs to a region on the other side. Instead of making the system matrix D that includes all of the inequalities in the system, as in the previous embodiment, this embodiment stores only unique inequalities a transformed system matrix D*. Because some regions are on the positive side of the inequalities and other regions are on the negative side of the inequalities, some of the terms that make up the Boolean functions representing each region are negated.

Accordingly, the embodiment transforms 510 at least some inequalities in the set of inequalities 340 to produce a set of unique inequalities 515. For example, the embodiment can transform a first inequality in the set inequalities into a negation of a Boolean result of a second inequality in the set inequalities, wherein the first and the second inequalities represent opposite subspaces from a facet in the state space.

Figure 5B:
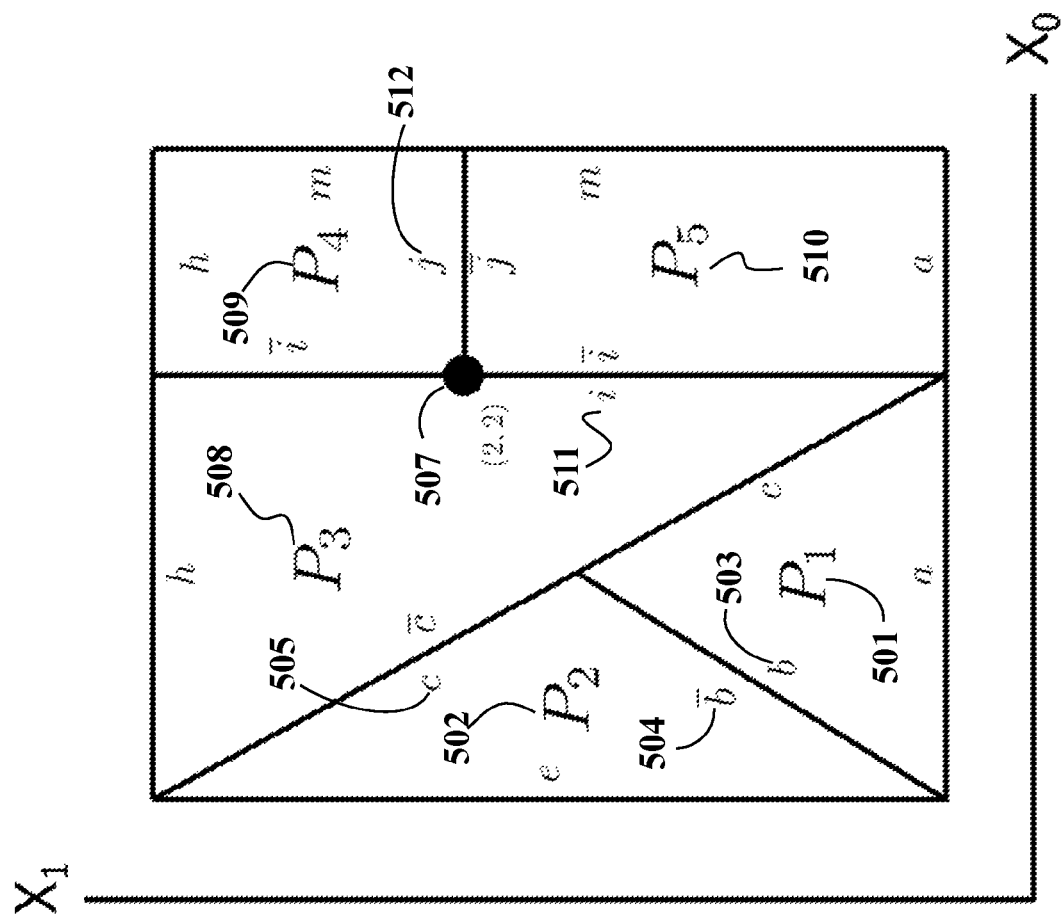
FIG. 5B is a diagram of a fragment of a state space of the controlled system partitioned into polyhedral regions according to inequalities with reduced redundancy according to some embodiments of the invention.

FIG. 5B shows a state space diagram of the same EMPC controller shown in the example of FIG. 2 with the redundant inequalities removed and negation introduced. The first region $P_1$ 501 is unchanged. In region $P_2$ 502, inequalities d and f were redundant and have been removed. $P_2$ is on the opposite side of inequality b 503 as $P_1$ and therefore inequality d has been replaced with a negated copy of b, $\overline{b}$ 504. $P_2$ is on the same side of inequality c as $P_1$ and therefore inequality f has been replaced with a direct copy of c 505.

The transformed system matrix D* is now D*=[a b c e h i j m]$^T$. The Boolean functions for each region shown in terms of both the inequalities and the elements of the result vector o are $$F_1 abc = o_1 o_2 o_3$$

$$F_2 \overline{b}ec = \overline{o_2} o_4 o_3$$

$$F_3 \overline{c}hi = \overline{o_3} o_5 o_6$$

$$F_4 \overline{j}\overline{i}hm = o_7 \overline{o_6} o_5 o_8$$

$$F_5 a\overline{i}jm = o_1 \overline{o_6} o_7 o_8$$

The negation of the result of evaluating an inequality is a taking of the logical opposite of that result. The logical opposite of the ≤ operation is the > operation. Therefore, by introducing negation, the two or more regions cannot be active simultaneously. As an example, the point (2,2) 507 in FIG. 5B can fall within the regions $P_3$ 508, $P_4$ 509, and $P_5$ 510. After the introduction of negation, if inequality i 511 is true, then only region P3 can be active. If inequality i is false, then either $P_4$ or $P_5$ are active. Likewise, depending on whether inequality i 512 is true or false, only one of $P_4$ and $P_5$ can be active.

In the standard EMPC controller formulation, all of the inequalities are non-strict inequalities that use the ≤ operator. Two operations are required to perform this comparison. First, the right side of the equation is subtracted from the left side of the equation. If the result of the subtraction is negative then the less than part of the comparison is true. This condition can be detected quite easily by inspecting the sign bit of the result. In order to determine if the left side of the inequality is equal to the right side, an OR operator is applied to all of the bits of the subtraction result. If the result of the OR operation is zero, then the left and right hand sides of the inequality are equal. Depending on the circuit architecture of the MAC unit, implementing the equal part of the comparison can result in a circuit with higher latency, which in turn limits performance of the overall controller circuit.

Accordingly, some embodiments of the invention transform 520 at least some non-strict inequalities into strict inequalities. For example, if the second inequality, in the above-example, is a non-strict inequality, some embodiments transform the second inequality into a strict inequality.

In one embodiment of the invention, the standard representation of the EMPC controller is reformulated such that all of the inequalities in the system take the form $$H_i \theta < k_i.$$

This embodiment is based on the realization that because the boundaries belong to all neighboring regions, the state can be assigned to any one of those regions. In this way, points in the state space that fall on the line $$H_i \theta = k_i,$$

are always assigned to the region using the negated version of the inequality.

For example, suppose $r \equiv H_i \theta \leq k_i$. This embodiment solves a modified version of r, $$r' \equiv H_i \theta < k_i.$$

Regions that include the term r' in their Boolean function $F_i$ are not active for points in the state space that fall on the line $H_i \theta = k_1$. However, regions that include the term r' are active when the state is on that line. Thus, this embodiment eliminates the equality check, which enables a simpler and more efficient circuit implementation, while still preventing multiple regions from being active simultaneously.

Digital Circuit Architecture

It is a further object of some embodiments of the invention to design a general digital circuit that can be applied to a wide range of EMPC problem sizes and target devices. To this end, the number of MAC units used in any particular implementation of a controller can be selected such that the resulting circuit meets some design goal. Often the design goal is that the resulting circuit does not use more MAC units than are available in a particular FPGA or can fit on a particular ASIC. However, other design goals, such as power consumption or cost, can also be considered.

In order to satisfy the goals of performance and scalability, some embodiments start with a general description of a digital circuit in a Hardware Description Language (HDL) and automatically transform the HDL into a description of an MPC controller for a specific problem using software tools. HDLs are programming languages for designing circuits. These descriptions can then be used to design a specific FPGA or ASIC. The synthesis process is performed using a commercial synthesis tool such as Xilinx® Integrated Software Environment (ISE) or a Synopsys Design Compiler®.

Figure 6:
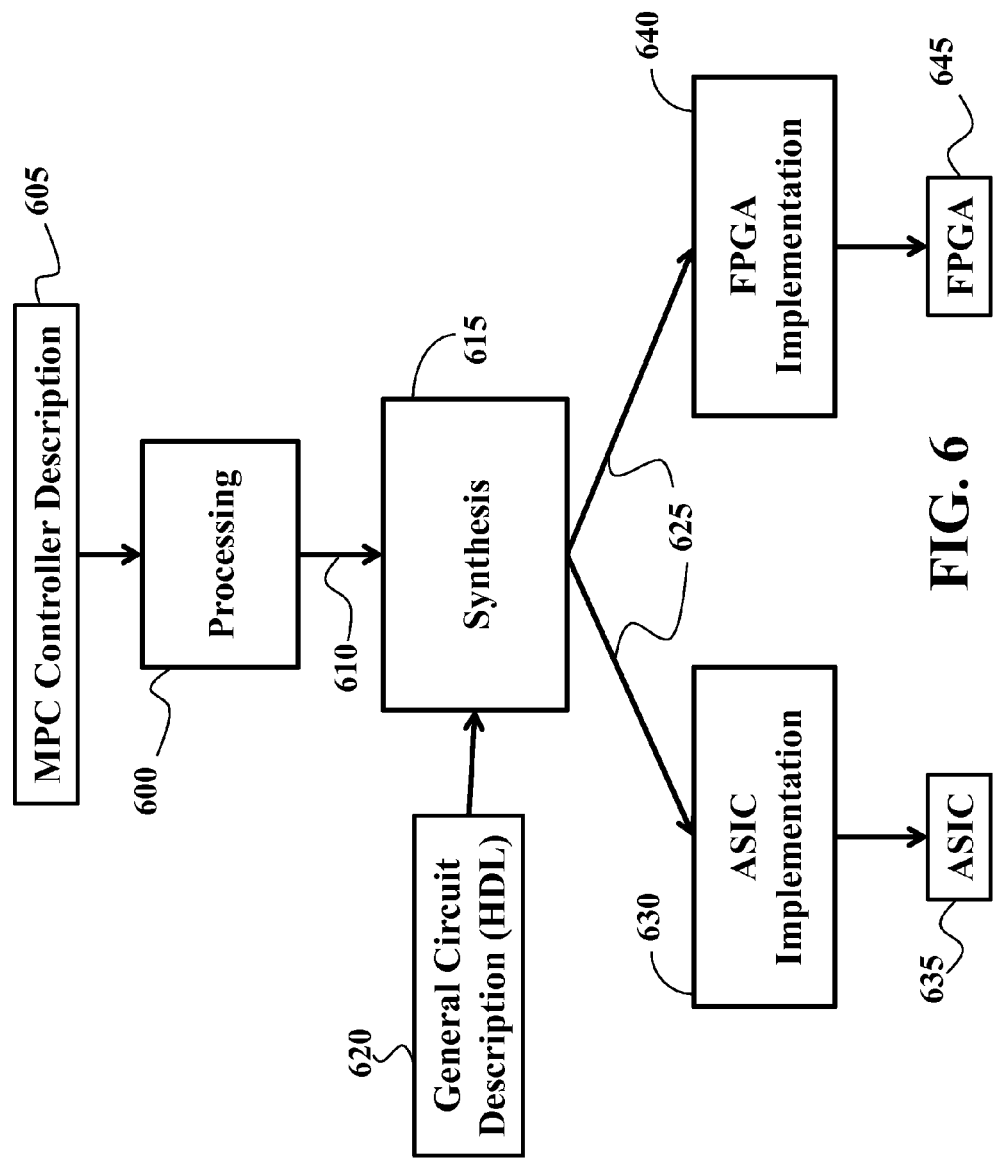
FIG. 6 is a flow chart of a method for making a controller for controlling the system using the EMPC according to some embodiments of the invention.

FIG. 6 shows a flow chart of a method for making the controller according to some embodiments of the invention. A processing step 600 is performed by software using a description of an MPC controller 605. The result of the processing step is controller data 610. The synthesis step 615 uses the controller data and the general HDL circuit description 620 to synthesize a controller circuit that is specific to the controller description 605. The controller circuit is stored in a netlist 625 that is then used by one of the implementation steps. The ASIC implementation step 630 translates the netlist into gates and interconnections that can be implemented in an ASIC 635. The FPGA implementation step 640 is similar but results in a FPGA 645.

Figure 7:
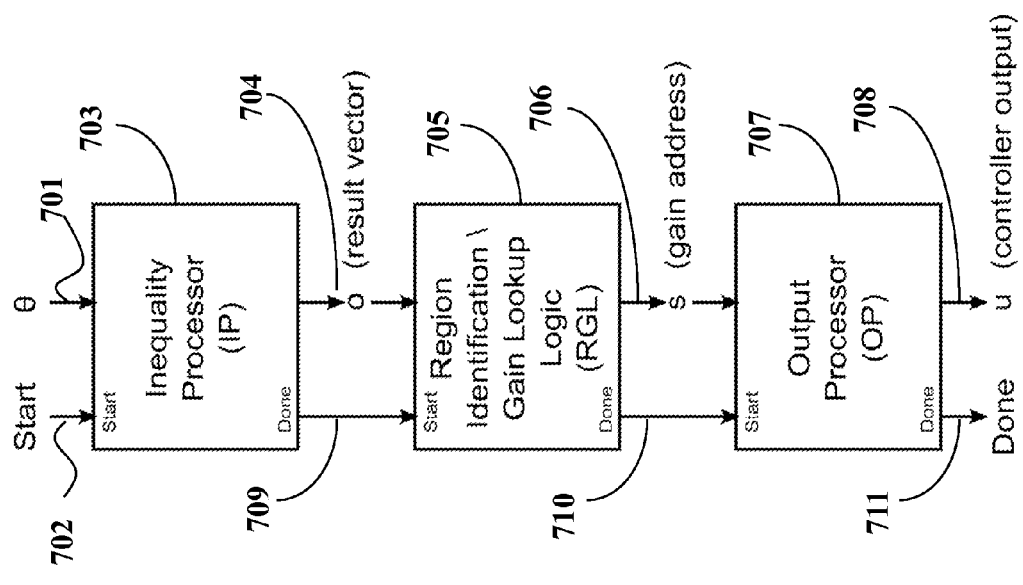
FIG. 7 is a block diagram of a circuit for the controller according to some embodiments of the invention.

FIG. 7 is a block diagram of the circuit architecture of the controller according to some embodiments of the invention. When the augmented system state signal θ 701 is updated, the controller start signal 702 is asserted to indicate the beginning of the processing. An inequality processing (IP) unit 703 evaluates all of the inequalities in the system and produces a set of Boolean results, e.g., a vector o 704, which has one element for each inequality in the system. A zero in a particular position of the set indicates that the corresponding inequality is false, and a one indicates that the corresponding inequality is true.

A region identification and gain lookup logic (RGL) unit 705 processes the set of Boolean results to determine the operating region of the controller. Based on the active region, the RGL unit generates a gain address signal s 706. The output processing (OP) unit 707 uses the gain address signal to select the correct gain coefficients for use in calculating the controller output u 0708. Intermediate start signals 709 and 710 control the flow of data between the IP, RGL, and OP units. The done signal 711 indicates that the controller has finished the output calculation and the controller output can be sent to the system.

Figure 8:
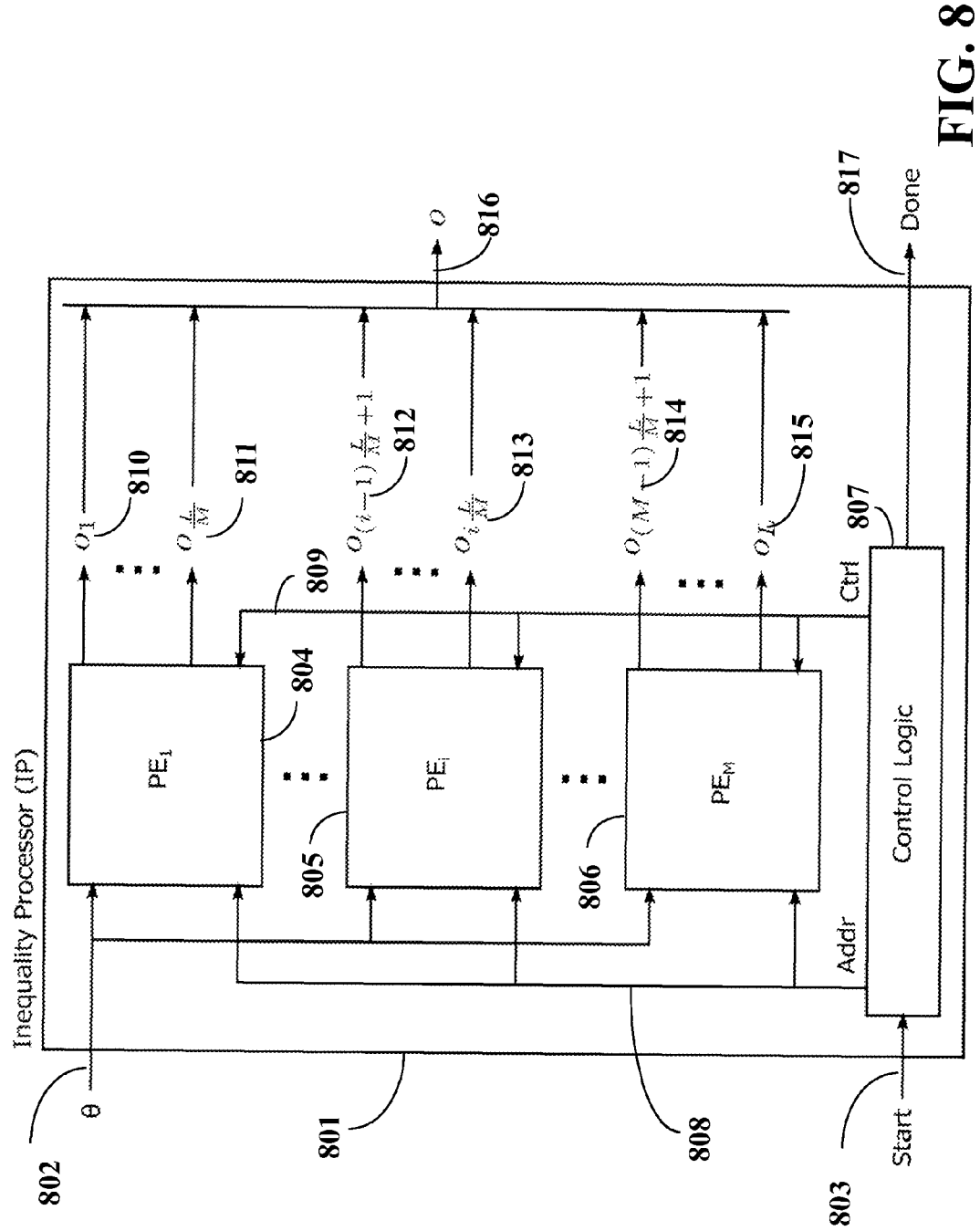
FIG. 8 is a block diagram of the inequality processing unit according to some embodiments of the invention.

FIG. 8 shows details of the IP module 801. The inputs to the IP are the augmented state signal θ 0802 and the start signal 803. The IP is composed of M Processing Elements (PEs) where M is an integer that is greater than or equal to one. The first processing element in the system is $PE_1$ 804, intermediate processing elements are $PE_i$ 0805, and the last processing element is $PE_M$ 806.

The IP also contains control logic unit 807 that generates an address signal 808 and a set of control signals 809 to control the operation of the PEs in the IP. The control logic unit can also allocate subsets of inequalities among different PEs. For example, for a controller that includes L inequalities, the inequalities are allocated among the PEs such that each PE processes $$\frac{L}{M}$$

inequalities. Each PE generates one output for each inequality that the PE processes. For example, a $PE_1$ generates output signals $o_1$ 810 through $o_{L/M}$ 811, intermediate Pes, $PE_i$, generate output signals $o_{(M-1)L/M+1}$ 812 through $o_{iL/M}$ 813, and the last PE, $PE_M$, generates output signals $o_{(M-1)L/M+1}$ 814 through $o_L$ 815. Each individual output signal is then aggregated into the output vector o 816 which has L elements. When the processing operation is complete the control logic asserts the done signal 817.

Figure 9:
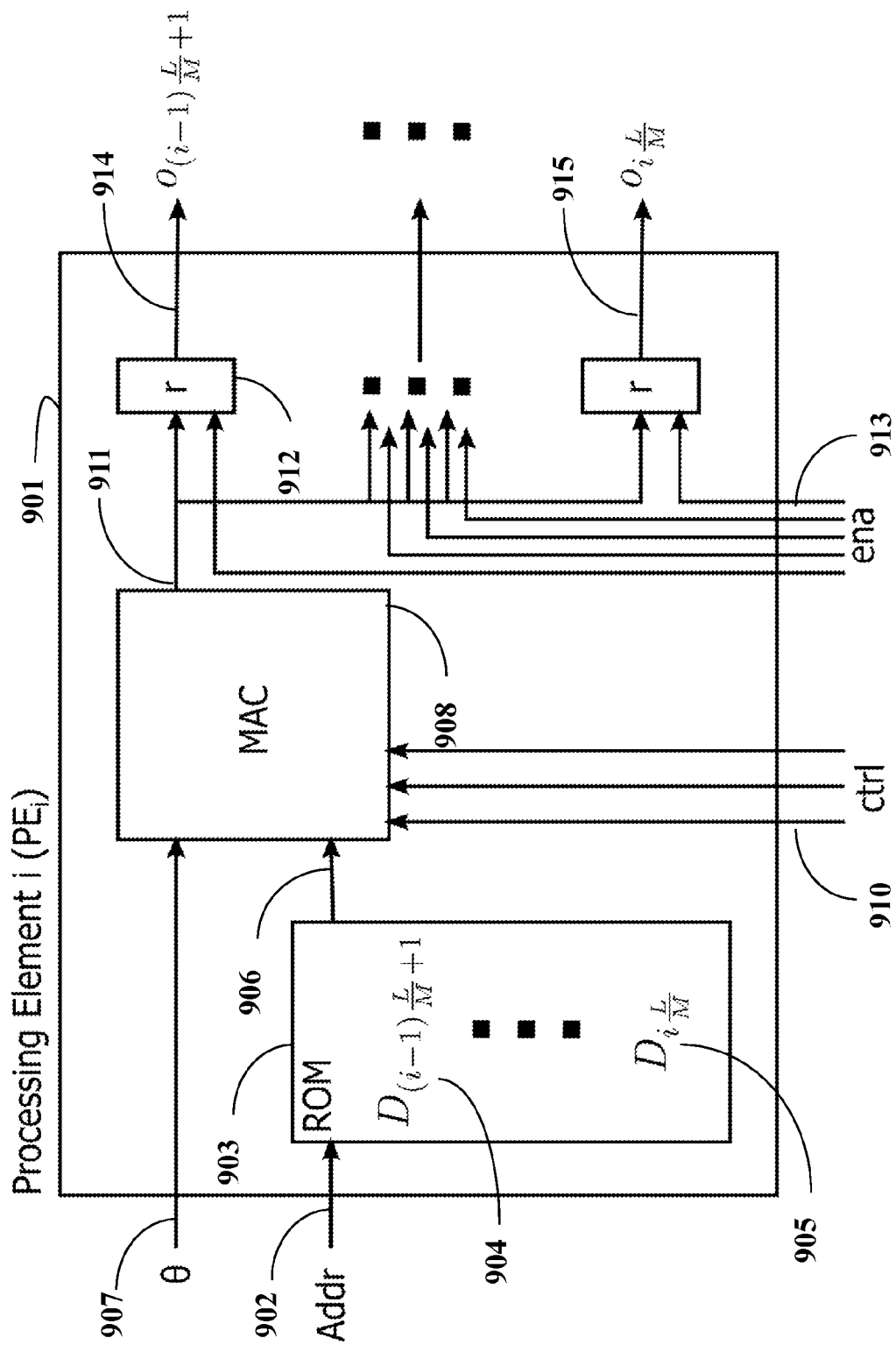
FIG. 9 is a block diagram of a processing element (PE) of the inequality processing unit according to some embodiments of the invention.

FIG. 9 is a block diagram of the $i^{th}$ processing element, $PE_i$ 901. The Addr signal 902 is used to lookup inequality coefficients in the memory, e.g., read only memory (ROM) 903. The ROM includes L/M inequalities, where L is the number of inequalities in the controller, and M is the number of PEs in the controller. If D is a matrix with L rows comprising all the inequalities in the controller, the ROM of $PE_i$ includes a subset of D having rows $D_{(i-1)L/M+1}$ 0904 through $D_{iL/M}$ 905. The ROM output 906 and the augmented state signal θ 907 enter the multiply accumulate unit (MAC) 908 to be multiplied together and added to a running sum that is stored inside the MAC unit. A plurality of control signals 910 determines the sequence of operations performed inside the MAC unit. When all of the coefficients representing a single inequality have been multiplied by the elements of the state and accumulated, the result is a single bit that indicates whether the inequality is true or false. That single bit signal forms the output of the MAC unit 911. For each inequality there is an output register r 912 that stores the MAC output. The L/M enable signals 913 control when each output register stores the value of the MAC output signal, such that output of each register represents the result of evaluating the corresponding inequality from the ROM. As such, the first output $o_{(i-1)L/M+1}$ 914 is the result of evaluating the first inequality in the ROM 904 and the last output $o_{iL/M}$ 915 is the result of evaluating the last inequality in the ROM 905.

Figure 10:
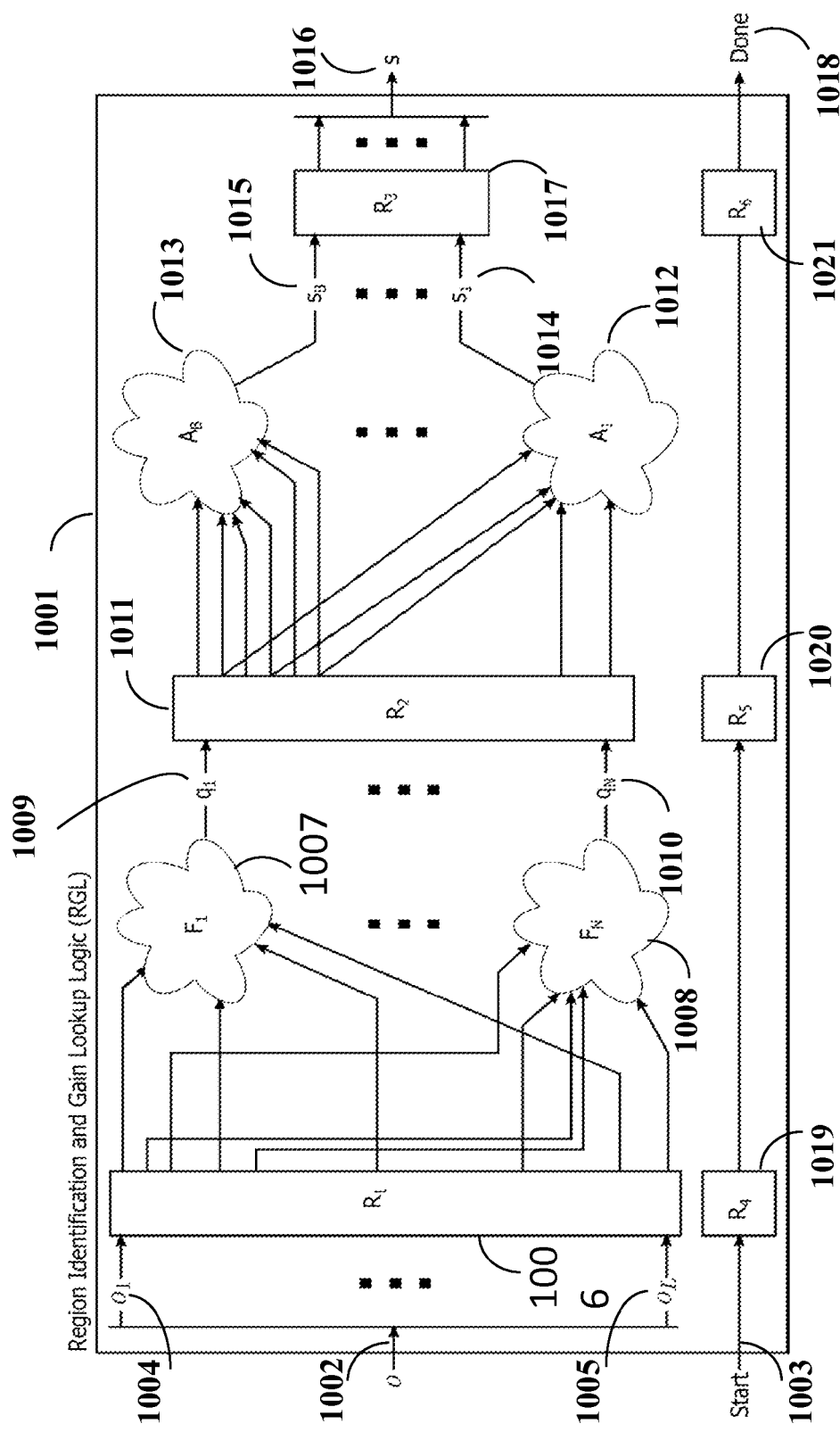
FIG. 10 is a schematic of a region identification and gain lookup logic (RGL) unit according to some embodiments of the invention.

FIG. 10 is a schematic of the region identification and gain lookup logic (RGL) unit 1001 according to one embodiment of the invention. The RGL unit receives the set of Boolean results, such as the vector o 1002, and a start signal 1003 as inputs. The elements of the vector o, $o_1$ 1004 through $o_L$ 1005, are stored in register $R_1$ 1006. Each Boolean function $F_1$ 1007 through $F_N$ 1008, where N is the number of regions in the controller, determine whether a particular region is active and generate a corresponding output, $q_1$ 1009 through $q_N$ 1010, that takes the value of one when active and zero when inactive. The vector q is the region vector and its values indicate which controller region is active. The q vector is then registered in register $R_2$ 1011. Another set of Boolean functions, $A_1$ 1012 through $A_B$ 1013, operate on the registered vector q to generate a memory address at which is stored a set of gain coefficients associated with the active region. Each Boolean function $A_i$ generates a single bit, $s_1$ 1014 through $s_B$ 1015, of the overall gain address vector s 1016. The gain address vector s is registered in $R_3$ 1017 prior to moving to the next module in the controller. The RGL does not require any control logic like the other modules in the controller. The Start and Done 1018 signals simply pass through three registers R4 1019, R5 1020, and R6 1021 to keep them synchronized with the data moving through the module.

Figure 11:
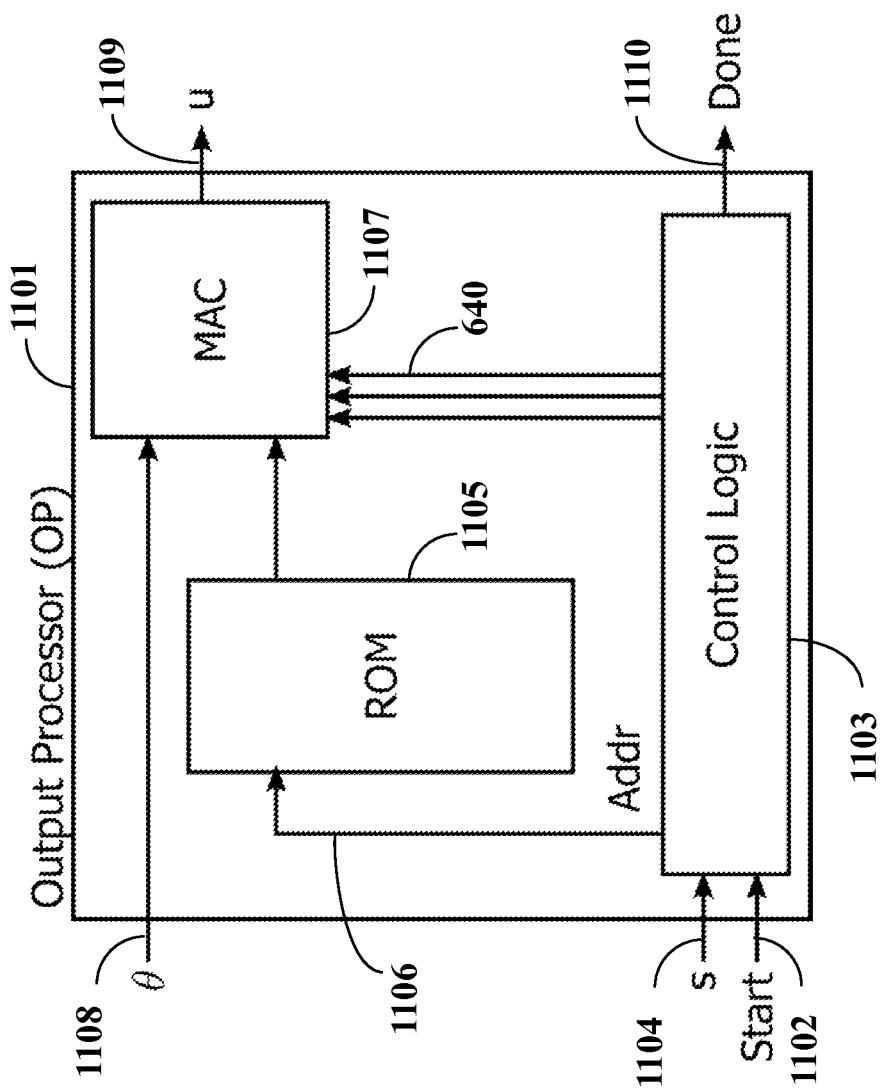
FIG. 11 is a block diagram of an output processing unit according to some embodiments of the invention.

FIG. 11 is a block diagram of the OP 1101. The Start signal 1102 initiates the controller output calculation. The control logic 1103 uses the gain address vector s 1104 as a pointer into the ROM 1105 indicating where the correct gain coefficients are stored. Using s as a starting address the control logic generates an address signal 1106 which increments to address each gain coefficient as it is needed in the calculation. The MAC 1107 multiplies elements of the augmented state vector θ 1108 with gain coefficients from the ROM and adds them to a running sum. At the end of this process the controller output u 1109 is generated and the signal 1110 is set to one.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools.

Also, the embodiments of the invention may be embodied as a method, of which an example has been provided. The steps performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling a system using an explicit model predictive control (EMPC), comprising:
evaluating, with respect to a state of the system, each inequality in a set of inequalities defining a set of regions of a state space of the system to produce a set of Boolean results, wherein at least some of the inequalities in the set of inequalities are evaluated concurrently, and wherein a size of the set of Boolean results is equal to a size of the set of inequalities;
determining a region including the state by applying a Boolean function to elements of the set of Boolean results corresponding to inequalities forming boundaries of the region, wherein at least some Boolean functions are applied to corresponding elements concurrently after all elements in the set of Boolean results are evaluated; and
determining a control for controlling the system based on the state and a gain associated with the region, wherein steps of the method are performed by a processor;
wherein the set of Boolean results is a binary vector, wherein each element of the binary vector is one when a Boolean result of a corresponding inequality is true, and, otherwise, is zero, and further comprising:
determining Boolean functions for all combinations of elements of the binary vector forming boundaries of each region in the set of regions to produce an output vector, wherein the Boolean function is a product of a combination of the elements, so that an element of the output vector corresponding to the region is one, and other elements of the output vector are zero.

2. The method of claim 1, further comprising:
transforming at least some inequalities in the set of inequalities to produce a set of unique inequalities.

3. The method of claim 1, further comprising:
transforming a first inequality in the set of inequalities into a negation of a Boolean result of a second inequality in the set of inequalities, wherein the first and the second inequalities represent opposite subspaces from a facet in the state space.

4. The method of claim 3, wherein the second inequality is a non-strict inequality, further comprising:
transforming the second inequality into a strict inequality.

5. The method of claim 1, wherein all inequalities are evaluated concurrently.

6. The method of claim 1, wherein inequalities are evaluated using a multiply accumulate (MAC) operation.

7. The method of claim 1, further comprising:
determining each bit of an address in a memory storing the gain as a Boolean combination of products of subsets of elements of the output vector.

8. A controller for controlling a system using an explicit model predictive control (EMPC), comprising:
an inequality processing (IP) unit for evaluating, with respect to a state of the system, each inequality in a set of inequalities defining a set of regions of a state space of the system to produce a set of Boolean results having one element for each inequality in the set, wherein at least some inequalities from the set are evaluated concurrently, wherein a zero in a particular position of the set indicates that a corresponding inequality evaluated to false and a one indicates that the corresponding inequality evaluated to true;
a region identification and gain lookup logic (RGL) unit for determining a region including the state by applying a Boolean function to elements of the set of Boolean results corresponding to inequalities forming boundaries of the region, and for determining a gain associated with the region; and
an output processing unit for determining a control for controlling the system based on the state and the gain associated with the region;

wherein the RGL unit determines Boolean functions for all combinations of elements of the set of Boolean results forming boundaries of each region in the set of regions to produce an output vector, wherein the Boolean function is a product of the combinations of elements, such that an element of the output vector corresponding to the region equals one, and other elements of the output vector equal zero.

9. The controller of claim 8, wherein the IP unit comprises:
   a plurality of processing elements (PEs) arranged in parallel for concurrent processing of the at least some inequalities; and
   a control logic unit for controlling an operation of the PEs.

10. The controller of claim 9, wherein a PE comprises:
    a memory for storing a subset of inequalities allocated to the PE; and
    a multiply accumulate unit (MAC) for evaluating the subset of inequalities with respect to the state based on multiplication of coefficients of each inequality in the subset with elements of the state.

11. The controller of claim 10, wherein the memory includes a set of unique inequalities, wherein each unique inequality is transformed into a strict inequality.

12. The controller of claim 10, wherein the Boolean function includes a negation result of the strict inequality.

13. The controller of claim 8, wherein the RGL unit determines each bit of an address in a memory storing the gain as a Boolean combination of products of subsets of elements of the output vector.

\* \* \* \* \*